UNITED STATES PATENT OFFICE.

NORMAN T. ORMSBY, OF CHICAGO, ILLINOIS.

IMPROVEMENT IN PREPARATIONS FOR THE HAIR.

Specification forming part of Letters Patent No. 127,983, dated June 18, 1872.

Specification describing a certain compound called "Dolly Varden Preparation for the Hair," invented by NORMAN T. ORMSBY, of Chicago, in the county of Cook and State of Illinois, to be used for promoting the growth of human and animal hair.

The nature of this invention relates to the composition of certain tinctures with the laurel oil of commerce, for causing the growth of human and animal hair upon bare spots of skins, and for promoting its growth where it is thin and feeble.

To one pound of laurel oil I add one-half ounce of tincture of benzoin, one-half ounce tincture cantharides, and one-half ounce tincture capsicum, and thoroughly mix the whole together.

In applying my preparation to the mane of a horse, it and the skin should be thoroughly cleansed in the following manner, before treating: To two gallons of warm water add twenty-five grains of soda ash; saturate the hair and mane with this solution, and rub gently with castile soap to form a lather, and rinse well with clear warm water to remove grease, dirt, and perspiration; rub dry with cloths and sponge, and comb it out smooth, and cover with a blanket until perfectly dry. Part the mane in the middle longitudinally, and comb it carefully, so as not to break it or pull out any of the hairs. Then apply my preparation, rubbing it well in, and rub the skin with the fingers anointed with the preparation. It is not intended to saturate the hair except at or near the roots, which, if properly done, will render the effect apparent throughout the length of the mane, after which the washing and rinsing should be repeated, as above described. Treat the tail in like manner, except that it should be parted in three strips. Three applications per week will cause the hair to grow fast, thick, and glossy, wherever the compound is applied, provided the roots of the hair have not been pulled out.

For promoting the growth of human hair the treatment is substantially the same as above described, except that a less quantity of the preparation need be used at each application.

It will be noticed that this compound or preparation contains no poisonous matter, or anything that will injure the hair, skin, or scalp.

What I claim as my invention, and desire to secure by Letters Patent, is—

The herein-described compound, to be known as the "Dolly Varden Preparation for the Hair," composed of the ingredients and substantially in the proportions herein set forth.

NORMAN T. ORMSBY.

Witnesses:
WM. H. LOTZ,
EMILE WAGNER.